(12) United States Patent
Wang et al.

(10) Patent No.: US 7,895,827 B2
(45) Date of Patent: Mar. 1, 2011

(54) METHOD AND APPARATUS FOR CONTROLLING ENGINE OPERATION DURING REGENERATION OF AN EXHAUST AFTERTREATMENT SYSTEM

(75) Inventors: Yue-Yun Wang, Troy, MI (US); Ibrahim Haskara, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 897 days.

(21) Appl. No.: 11/536,006

(22) Filed: Sep. 28, 2006

(65) Prior Publication Data

US 2008/0078167 A1     Apr. 3, 2008

(51) Int. Cl.
*F01N 3/00* (2006.01)
(52) U.S. Cl. ............... 60/286; 60/274; 60/285; 60/290; 60/295
(58) Field of Classification Search .................. 60/276, 60/285, 286, 295, 274, 290
See application file for complete search history.

(56) References Cited

U.S. PATENT DOCUMENTS

| | | | | |
|---|---|---|---|---|
| 6,318,083 B1 * | 11/2001 | Machida et al. | ............ | 60/601 |
| 6,354,269 B1 * | 3/2002 | Saito et al. | ............ | 123/436 |
| 6,851,258 B2 * | 2/2005 | Kawashima et al. | ............ | 60/311 |
| 6,907,862 B2 * | 6/2005 | Kitahara | ............ | 123/434 |
| 2005/0022517 A1 * | 2/2005 | Miura | ............ | 60/295 |

FOREIGN PATENT DOCUMENTS

JP          05223664 A  *  8/1993

OTHER PUBLICATIONS

Wang, Y.Y., Event-Based Estimation of Indicated Torque for IC Engines using Sliding-Mode Observers, Control Eng. Practice, 1997, pp. 1123-1129, vol. 5, No. 8, Elsevier, GB.

* cited by examiner

*Primary Examiner* — Binh Q Tran
*Assistant Examiner* — Jesse Bogue

(57) ABSTRACT

There is provided a method and apparatus for controlling operation of an internal combustion engine, comprising controlling engine torque during regeneration of an exhaust aftertreatment system. This comprises controlling post-injection of fuel into a combustion chamber effective to regenerate an exhaust aftertreatment device. Main fuel injection into each combustion chamber and boost are selectively controlled effective to maintain engine output torque.

14 Claims, 5 Drawing Sheets

US 7,895,827 B2

METHOD AND APPARATUS FOR CONTROLLING ENGINE OPERATION DURING REGENERATION OF AN EXHAUST AFTERTREATMENT SYSTEM

TECHNICAL FIELD

This invention pertains generally to internal combustion engines, and related to controlling engine operation during exhaust aftertreatment regeneration.

BACKGROUND OF THE INVENTION

Modern internal combustion engines are equipped with sophisticated systems to monitor and control various aspects of engine performance during ongoing operation to meet operator demands for performance, including torque and fuel economy, and to satisfy government regulations related to emissions, safety, and fuel economy. Engine systems operable at lean air/fuel ratios, including diesel engines and homogeneous-charge engines, are effective to achieve operator demands. Such engine systems utilize exhaust aftertreatment systems comprising diesel particulate filters (DPF), $NO_x$ traps (LNT), $NO_x$ adsorbers, and selective catalyst reduction (SCR) devices, either alone or in combination.

An exhaust aftertreatment device can require regeneration during its service life to maintain performance, and regeneration is often achieved by adjusting an exhaust gas feedstream to a stoichiometric or rich air/fuel ratio while operating at an elevated temperature, e.g., in the range of 600 C. The exhaust gas feedstream can be adjusted by controlling an engine management system, including injecting fuel into the combustion chamber post-combustion, modulating ratios of air and re-circulated exhaust gas, and other strategies including injection of a reductant into the exhaust gas feedstream upstream of the device.

Referring now to FIG. 1, data representing an in-cylinder pressure waveform is plotted as a function of engine crank angle in degrees (CA) for normal engine operation (FIG. 1A) and for engine operation which includes post-injection of fuel (PCI) (FIG. 1B). As shown by comparing the in-cylinder pressures in the figures, post-injection of fuel typically results in a second pressure spike and an increase in engine brake mean-effective-pressure. Thus, a system which injects fuel into the combustion chamber during a latter portion of the power stroke, i.e., post-combustion, can experience a torque boost during regeneration of the aftertreatment system. The torque boost results from burning of some of the post-injected fuel, and generates torque, perceptible as engine roughness.

One partial solution comprises balancing engine torque by tuning of main fuel injection and the post-injection of fuel through calibration on an engine dynamometer. However, such calibration requires extensive testing and analysis, and may not result in reduced engine roughness during real vehicle driving conditions due to the amount of fuel being injected post-combustion is typically adjusted according to real-time catalyst temperatures and inlet air-fuel ratio. Furthermore, the main injection typically causes a drop in fuel injection line pressure which may not have recovered at the time of post-injection of fuel following the main fuel injection. Therefore, torque contribution caused by post-injection may not be consistent with a predetermined calibration torque.

Therefore, there is a need for an engine control system which addresses the aforementioned concerns.

SUMMARY OF THE INVENTION

There is provided a method, preferably executed as a computer program in a control module for an engine system, for controlling operation of the internal combustion engine. This comprises controlling post-injection of fuel into a combustion chamber effective to regenerate an exhaust aftertreatment device. Main fuel injection into each combustion chamber is selectively controlled effective to maintain engine output torque.

Benefits achievable by this control method comprise the system operative to deliver and balance desired torque during aftertreatment regeneration when post-injection is used; the system operative to deliver engine torque more quickly and precisely in response to a operator torque demand, the system able to optimize fuel consumption via optimized torque controller design; and a reduction in calibration parameters and calibration effort.

The invention will become apparent to those skilled in the art upon reading and understanding the following detailed description of the embodiments.

BRIEF DESCRIPTION OF THE DRAWINGS

The invention may take physical form in certain parts and arrangement of parts, an embodiment of which is described in detail and illustrated in the accompanying drawings which form a part hereof, and wherein.

DETAILED DESCRIPTION OF AN EMBODIMENT OF THE INVENTION

Figure 2:
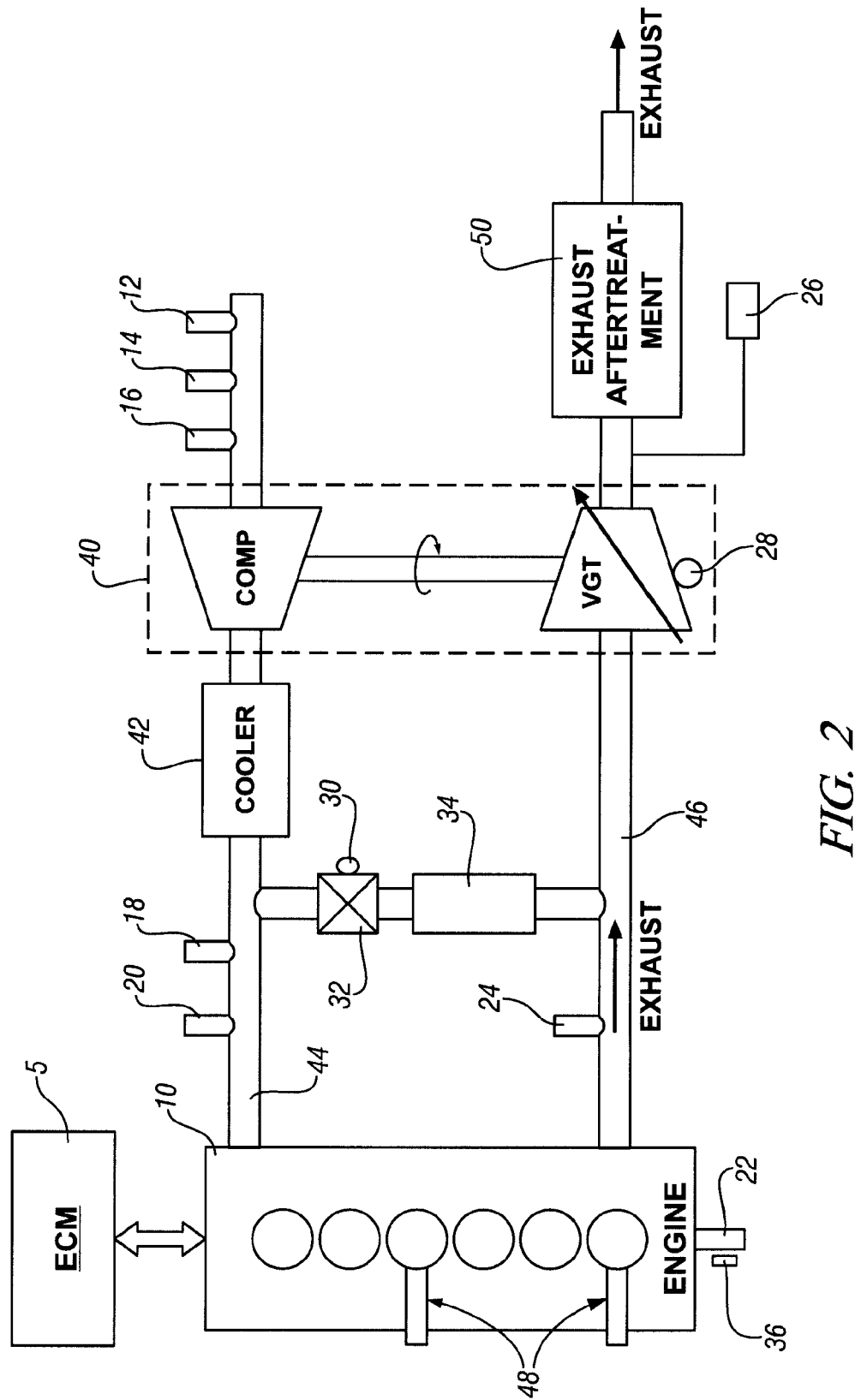
FIG. 2 is a schematic diagram of an exemplary engine system, in accordance with the present invention; and, FIGS. 3, 4, and 5 are graphical depictions of control schemes, in accordance with the present invention.

Referring now to the drawings, wherein the showings are for the purpose of illustrating the invention only and not for the purpose of limiting the same, FIG. 2 depicts an engine 10, engine control module (ECM) 5, and exhaust aftertreatment system 50 which has been constructed in accordance with an embodiment of the present invention. The exemplary engine 10 comprises a conventional multi-cylinder internal combustion engine mechanized to operate at a lean air/fuel ratio, shown as a compression-ignition configuration, although this invention is not meant to be limited to compression-ignition engine configurations. Engine system components include an exhaust gas recirculation (EGR) valve 32 and cooler 34, an intake manifold 44, and an exhaust manifold 46. The exhaust aftertreatment system 50 comprises devices, taken individually or in combination, operative to convert constituent elements of the exhaust gas feedstream to harmless gases, including, e.g., a diesel particulate filter (DPF), a lean $NO_x$ trap (LNT), an oxidation catalyst (DOC), and others. There is preferably an intake air compressing device 40 comprising a variable geometry exhaust turbine device (VGT) and an air-compressor (COMP), wherein boost of the air compressor is adjusted by varying position of the turbine vanes. The exhaust turbine device is connected to the exhaust manifold 46, is effective to receive flow of exhaust gas upstream of the aftertreatment system 50, and is preferably equipped with a wastegate controlled by an actuator operatively connected to the ECM. A VGT position sensor 28 monitors position of turbine vanes, typically measured in percent-open (%-open). A charge air cooler 42 is preferably placed in the intake air stream between the air-compressor and the intake manifold 44. There is a fuel injection system (not shown in detail) controlled by the ECM 5, and operative to deliver a quantity of fuel to each combustion chamber of each engine cylinder using a fuel injector. Preferably, the fuel injection system comprises a direct-injection system wherein fuel is directly injected into each combustion chamber. Sensing devices are installed on the engine to monitor physical characteristics and generate signals correlatable to engine and ambient parameters. The sensing devices preferably comprise an ambient air pressure sensor 12, an ambient or intake air temperature sensor 14, and a mass air flow sensor 16, all which can be configured individually or as a single integrated device; an intake manifold air temperature sensor 18, and an intake manifold pressure sensor 20. There is an exhaust gas sensor 24 operative to monitor exhaust gas parameters in the exhaust manifold 46, including for example, $NO_x$ concentration, air/fuel ratio, and exhaust gas temperature. Alternatively, or in addition, there is a second exhaust gas sensor 26 operative to monitor one or exhaust gas parameters immediately upstream of the exhaust aftertreatment device 50. An EGR valve position sensor 30 provides EGR position feedback. An engine speed sensor 22 provides engine speed (RPM), preferably by monitoring crankshaft rotational position. An engine-out torque sensing mechanism 36 is operatively connected to the crankshaft of the engine, effective to provide a real-time measurement of engine torque. Alternatively or in combination, there can be one or more pressure sensing devices 48 operative to monitor in-cylinder pressure during ongoing operation, from which cylinder mean effective pressure (MEP) can be determined, from which engine torque can be calculated. Alternatively, engine torque can be determined using an algorithm-based torque estimator which infers torque based upon engine operating parameters, e.g. engine speed, and predetermined calibrations. Each of the sensing devices is signally connected to the ECM 5 to provide signal information which is transformed by the ECM to information representative of the respective monitored parameter. It is understood that the configuration shown with reference to FIG. 2 is meant to be illustrative, not restrictive, in that not all the sensing devices shown are required for engine operation, and the various sensing devices can be replaced within functional equivalent devices and algorithms and still fall within the scope of the invention. Furthermore, the VGT turbine device 40 can comprise air-driven turbocharger devices and various supercharger devices driven by electrical, hydraulic, or mechanical power within the scope of the invention.

The sensors are operative to monitor engine operating characteristics from which parametric information can be determined, represented herein as follows, with representative units of measure provided: fresh mass air flow, gm/sec (sensor 16); intake manifold temperature, deg C (sensor 18); intake manifold pressure, kPa (sensor 20); ambient temperature, deg, C (sensor 14); ambient pressure, kPa (sensor 12); exhaust gas sensor in exhaust manifold 24; VGT position, %-open (sensor 28); EGR valve position, %-open (sensor 30); engine speed, revolutions/min (sensor 22); gas sensor measurement at inlet to aftertreatment system 26; in-cylinder pressure, MPa (sensors 48); and, engine torque, N-m (sensor 36).

The ECM 5 is preferably an element of an overall vehicle control system, comprising a distributed control module architecture operable to provide coordinated system control. The ECM is operable to synthesize pertinent information and inputs from the aforementioned sensing devices, and execute algorithms to control various actuators to achieve control targets, including such parameters including fuel economy, emissions, performance, driveability, and protection of hardware, as described hereinbelow. The ECM 5 is preferably a general-purpose digital computer generally comprising a microprocessor or central processing unit, storage mediums comprising read only memory (ROM), random access memory (RAM), electrically programmable read only memory (EPROM), high speed clock, analog-to-digital (A/D) and digital-to-analog (D/A) circuitry, and input/output circuitry and devices (I/O) and appropriate signal conditioning and buffer circuitry. A set of control algorithms, comprising resident program instructions and calibrations, is stored in ROM and executed to provide the respective functions of each computer. Algorithms are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

Figure 1B:
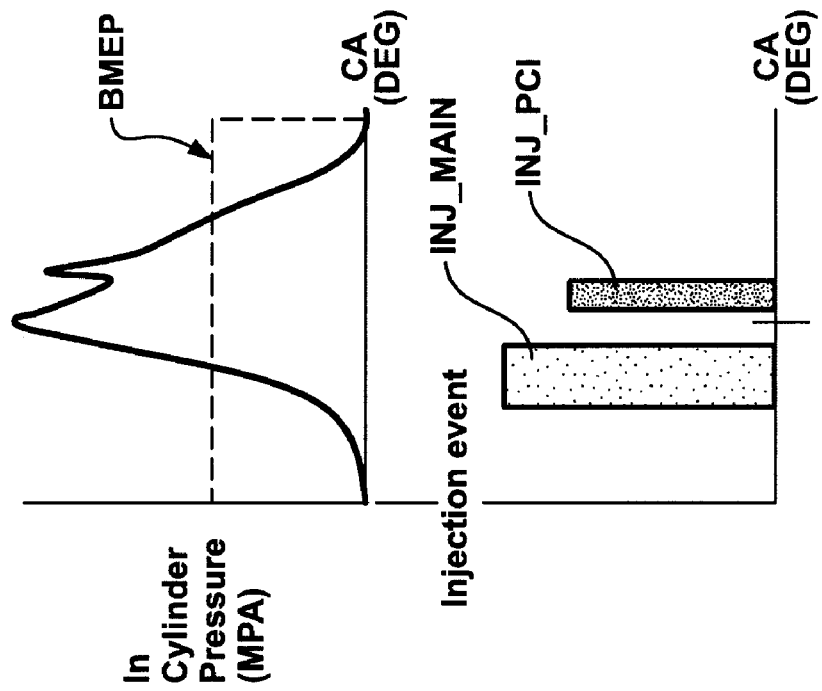
FIG. 1 is a graphical data depiction, in accordance with the present invention.
Figure 1A:
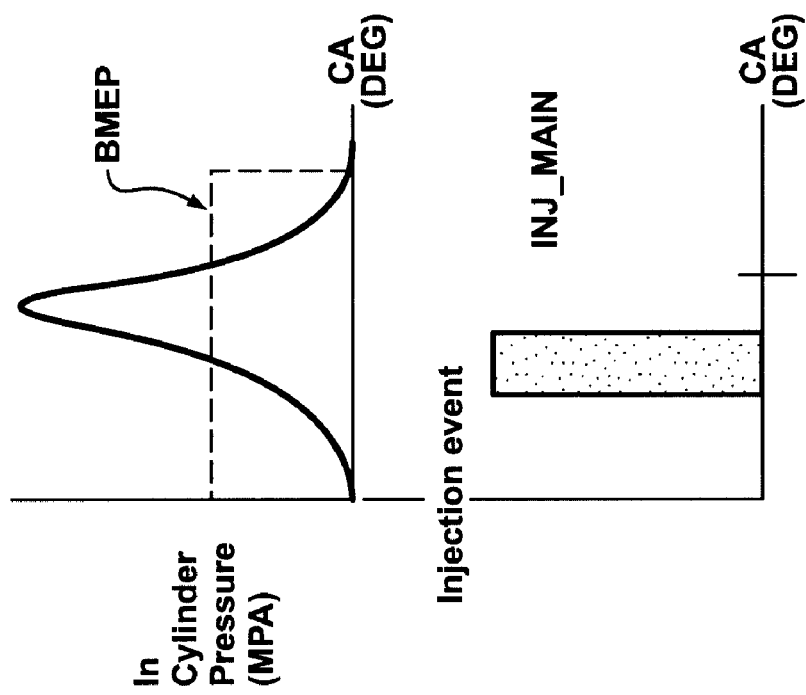
Figure 3:
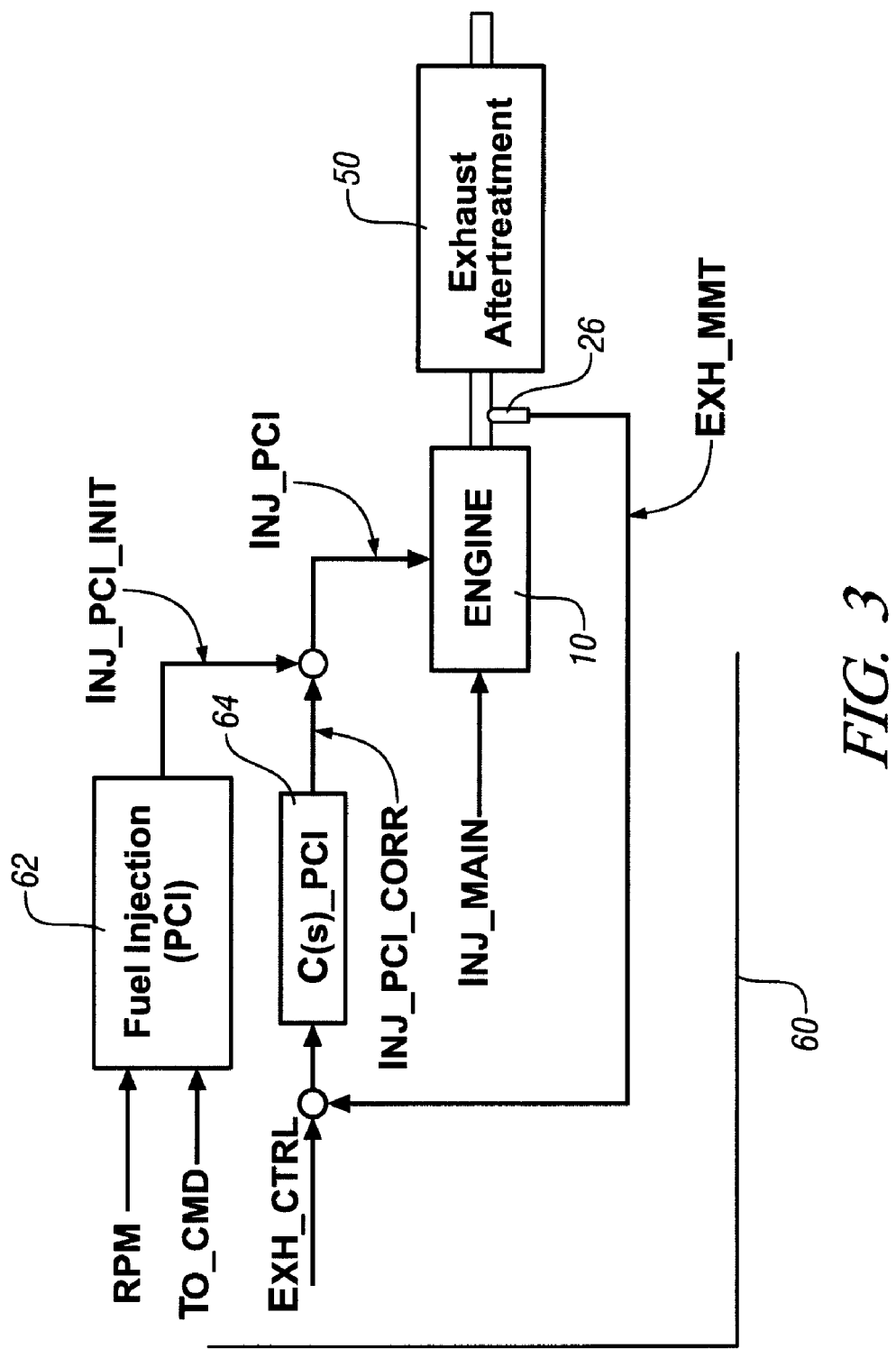
Figure 4:
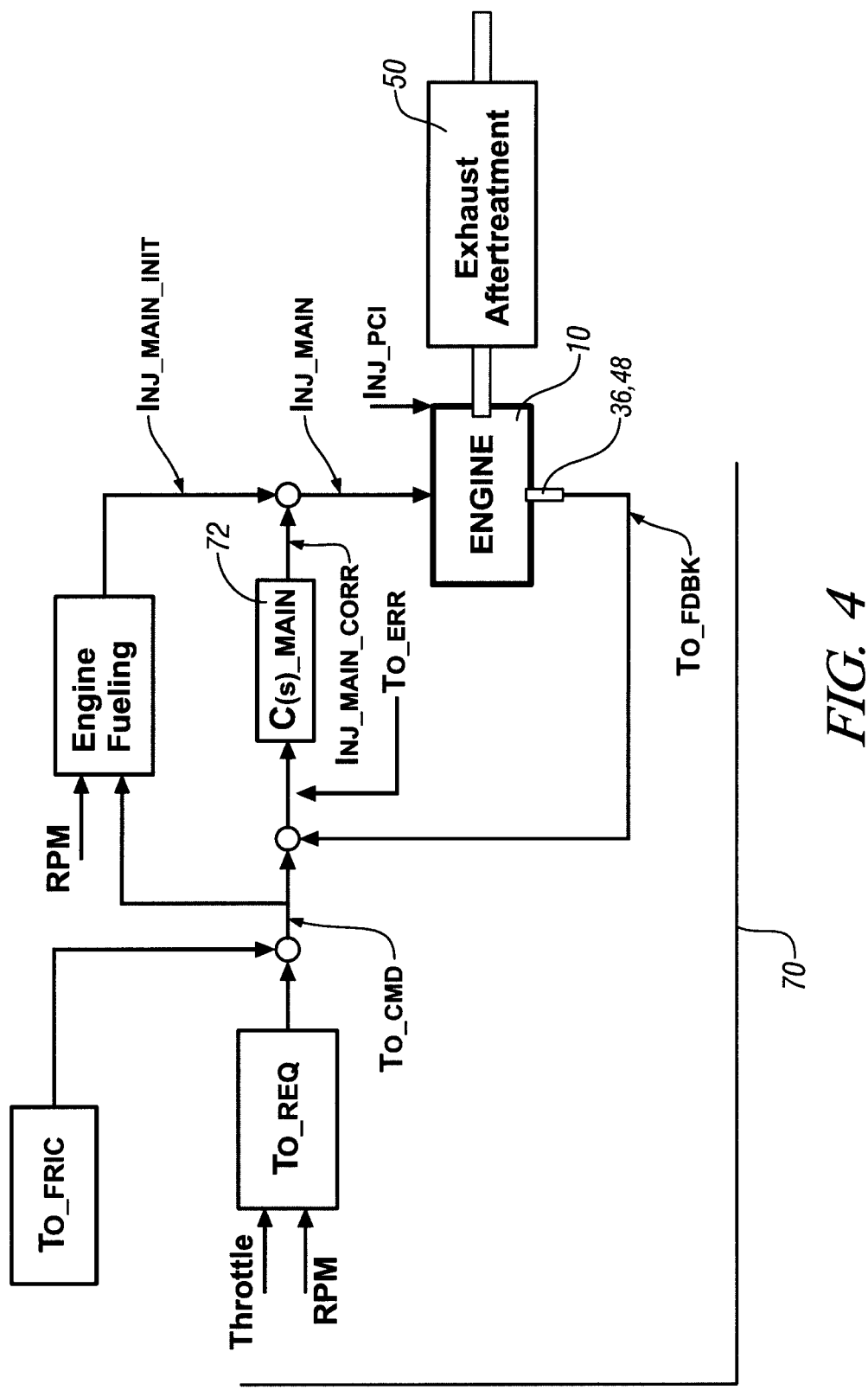
Figure 5:
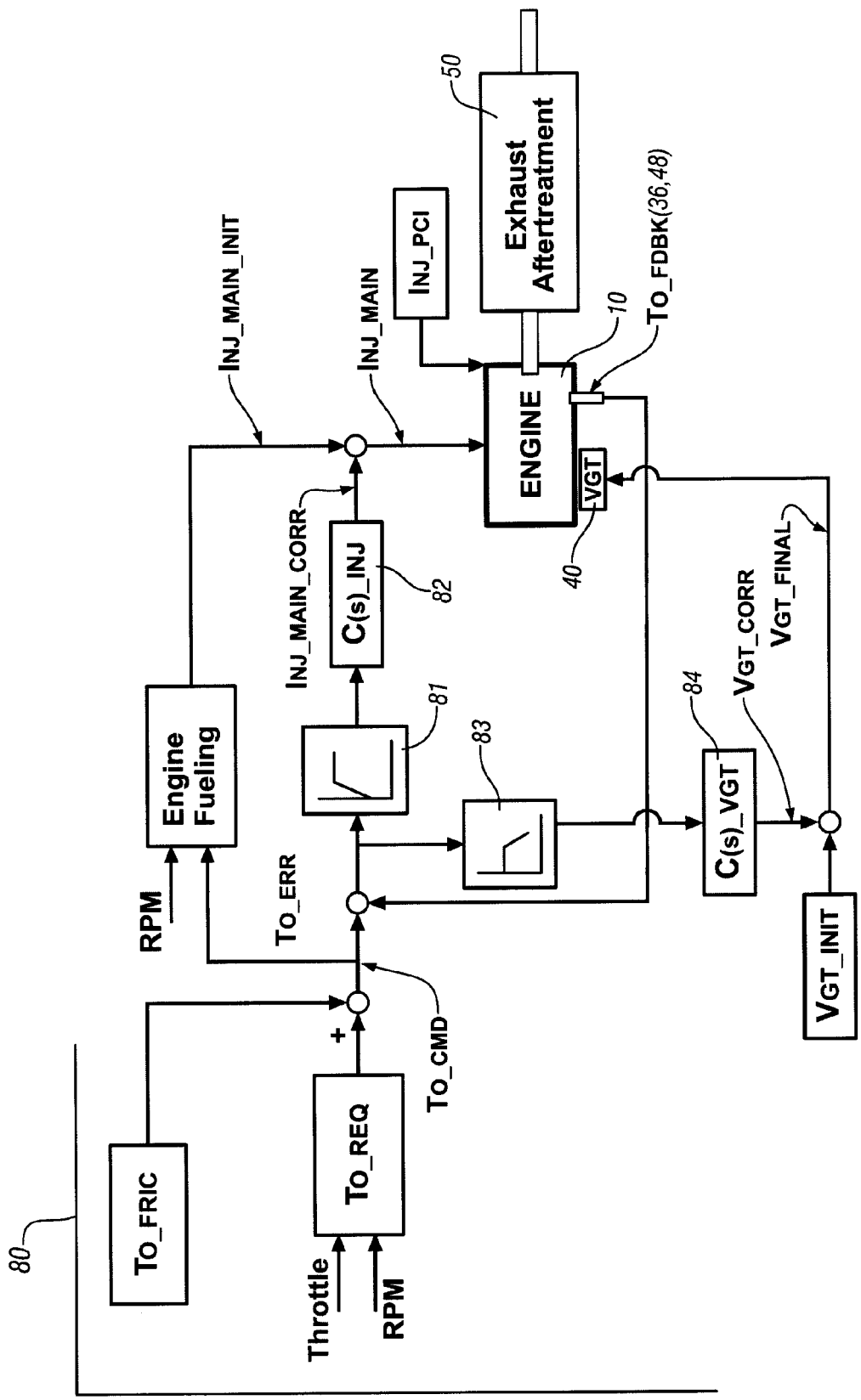

Referring now to FIGS. 3, 4, and 5, methods for controlling an engine are described, preferably executed as one or more algorithms in the ECM 5, effective to control operation of the exemplary internal combustion engine 10 described with reference to FIG. 1, to regenerate one or more elements of the exhaust aftertreatment system 50 during ongoing operation. The method includes controlling post-injection of fuel into each combustion chamber effective to regenerate an exhaust aftertreatment device, and selectively controlling main fuel injection into the combustion chamber based upon engine output torque. The post-injection of fuel preferably occurs during after a main portion of each power stroke of a combustion cycle, at a time permitting passage of fuel to the combustion chamber and out an opening exhaust valve into the exhaust manifold as part of the exhaust gas feedstream.

Regeneration of the exhaust aftertreatment system 50 is now described, with reference to a control scheme 60 shown with reference to FIG. 3. In operation, the ECM 5 determines a need to regenerate the exhaust aftertreatment device 50, based upon known criteria, e.g. elapsed engine operating time, or exhaust backpressure. Inputs to the control scheme 60 comprise engine speed (RPM), an operator torque command ($T_O\_CMD$), and an exhaust control parameter ($E_{XH}\_CTRL$). By way of example, when the exhaust aftertreatment device 50 comprises a diesel particulate filter (DPF), the exhaust control parameter $E_{XH}\_CTRL$ comprises a temperature, which is based upon an operating temperature necessary for effective burning of the particulate matter from the DPF device. One exemplary embodiment of the DPF has an exhaust control parameter $E_{XH}\_CTRL$ comprising a temperature of about 600 C. Alternatively, when the exhaust aftertreatment device 50 comprises a lean $NO_x$ trap (LNT) the exhaust control parameter $E_{XH}\_CTRL$ comprises an air/fuel ratio which is based upon an air/fuel ratio necessary for effective oxidation in the LNT device. One embodiment of the LNT has an exhaust control parameter $E_{XH}\_CTRL$ comprising an air/fuel ratio of about stoichiometry, or lambda=1.0. The control scheme is operative to determine an initial feed-forward quantity of fuel for post-injection fueling ($I_{NJ}\_PCI\_INIT$) based upon the engine speed (RPM) and the operator torque command ($T_O\_CMD$) (Block 62). Sensor 26 provides a measurement of the feedstream immediately upstream of the exhaust aftertreatment device ($E_{XH}\_MMT$), e.g., an air/fuel ratio or temperature. The measurement of the exhaust feedstream ($E_{XH}\_MMT$) is compared to the exhaust control parameter ($E_{XH}\_CTRL$), with the resultant input to a post-injection fuel control scheme, $C(s)\_PCI$ 64. The $C(s)\_PCI$ control scheme 64 comprises any one of several known closed-loop control schemes, preferably including proportional and integral elements, and executed as an algorithm in the ECM. The output of the control scheme C(s)_PCI (64) comprises a correction factor, $INJ\_PCI\_CORR$, which is added to the feed-forward quantity of fuel for post-injection fueling ($INJ\_PCI\_INIT$) to determine the quantity of fuel for post-injection, $INJ\_PCI$. This quantity of fuel, $INJ\_PCI$, is delivered to the combustion chambers of the engine at appropriate times to alter the exhaust gas feedstream sufficient to regenerate the exhaust aftertreatment device 50, e.g., to increase exhaust gas temperature or reduce air/fuel ratio.

Referring now to FIG. 4, a first control scheme 70 is now described for controlling engine torque during a regeneration of the exhaust aftertreatment system such as is described herein with reference to FIG. 3. During this operation, the ECM executes algorithms to control fuel injection for engine operation, $INJ\_MAIN$, and for post-injection, $INJ\_PCI$. Inputs to the ECM comprise an operator request for torque ($T_{O\_REQ}$), which is determined based upon engine speed (RPM) and operator inputs, e.g. throttle pedal position (Throttle). The operator request for torque ($T_{O\_REQ}$) is added to a torque required to overcome engine friction ($T_{O\_FDBK}$) to determine a commanded torque ($T_{O\_CMD}$). The commanded torque ($T_{O\_CMD}$) is combined with engine speed (RPM) to determine an initial quantity of fuel for delivery to power the engine during main fuel injection event ($INJ\_MAIN\_INIT$). The initial quantity of fuel injected into the engine combustion chamber ($INJ\_MAIN\_INIT$) is determined preferably using feed-forward control, which determines mass of fuel to be injected, accounting for engine design and operating characteristics. Engine torque is measured, as previously described, to determine a feedback torque value ($T_{O\_FDBK}$). The feedback torque value ($T_{O\_FDBK}$) and the commanded torque ($T_{O\_CMD}$) are arithmetically combined to determine a torque error ($T_{O\_ERR}$) which is input to a main control scheme C(S)_MAIN 72. The main control scheme 72 comprises any one of several known closed-loop control schemes, preferably including pre-calibrated proportional and integral elements that can be adapted during ongoing operation of the engine. The output of the main control scheme, C(s)_MAIN 72 comprises a correction factor, $INJ\_MAIN\_CORR$, which is added to the feed-forward quantity of main engine fueling ($INJ\_MAIN\_INIT$) to determine the quantity of fuel for injection, $INJ\_MAIN$. This quantity of fuel, $INJ\_MAIN$, is injected to one or more of the combustion chambers of the engine at appropriate times to power the engine during regeneration of the exhaust aftertreatment device 50.

In operation, a torque request, $T_{O\_REQ}$ is determined based on engine speed (RPM) and the operator throttle command (THROTTLE), and adding estimated friction torque $T_{O\_FRIC}$ to determine the final cylinder torque command, $T_{O\_CMD}$. Friction torque estimation can be based upon an offline calibration or an online estimator. For example, a high-bandwidth torque estimator can be used to extract a load torque contribution when there is no contribution (i.e., no moment arm to transmit torque) from the engine torque at TDC (top dead center) and BDC (bottom dead center). The feed-forward main injection quantity, $INJ\_MAIN\_INIT$, is determined by the final torque demand and current engine speed. When the exhaust aftertreatment device 50 to be regenerated comprises a diesel particulate filter, the post-injection is used to generate high temperature at the inlet to the aftertreatment device 50. During a vehicle operation, there are road transients and changes in ambient conditions which affect the post-injection quantity, and therefore the mass of post-injected fuel $INJ\_PCI$, needs to be adjusted accordingly through another feedback system as depicted previously with reference to FIG. 3, to meet a DPF inlet temperature target. This adjustment results in torque errors which may be perceived by the vehicle operator. To compensate for the torque errors, a portion of fuel is either added to or subtracted from the main injection, $INJ\_MAIN$, based on the torque error. The feedback control scheme C(s)_INJ in FIG. 4 can be designed by any type of control system design methodology. Torque feedback can be obtained from pressure sensors or can be directly measured by a torque sensor as described before. A model based torque estimator can be used to estimate engine torque by processing signals input from an engine speed sensor.

Referring now to FIG. 5, a second control scheme 80 is now described for controlling engine torque, during execution of a regeneration control scheme such as is described herein with reference to FIG. 3. This control scheme incorporates control of the intake air compressing device 40 comprising the variable geometry turbine device (VGT). During this operation, the ECM controls fuel injection to inject the quantity of fuel for post-injection, $INJ\_PCI$. Inputs to the ECM comprise the operator request for torque ($T_{O\_REQ}$), which is added to engine friction torque ($T_{O\_FRIC}$) to determine commanded torque ($T_{O\_CMD}$). The commanded torque ($T_{O\_CMD}$) is combined with engine speed (RPM) to determine an initial quantity of fuel for delivery during main fuel injection into the engine combustion chamber ($INJ\_MAIN\_INIT$). Engine torque is measured, as previously described, to determine a feedback torque value ($T_{O\_FDBK}$). The feedback torque value ($T_{O\_FDBK}$) and the commanded torque ($T_{O\_CMD}$) are arithmetically combined to determine a torque error ($T_{O\_ERR}$).

The torque error ($T_{O\_ERR}$) in this embodiment is used to control fuel injection and the intake air compressing device 40. Controlling fuel injection comprises passing the torque error ($T_{O\_ERR}$) through a high-pass signal filter 81 to selectively remove low frequency components of the torque error signal. The high-pass filter 'knee' comprises a calibration frequency that is preferably determined based upon air dynamics of the specific engine configuration. The high frequency portion of the torque error signal is input to an injection control scheme, C(s)_INJ 82 which preferably comprises pre-calibrated proportional and integral elements, and is analogous to the injection control scheme 72 described with reference to FIG. 4. The output of the injection control scheme, C(s)_INJ 82 comprises a correction factor, $INJ\_MAIN\_CORR$, which is added to the feed-forward quantity of main engine fueling ($INJ\_MAIN\_INIT$) to determine the quantity of fuel for injection, $INJ\_MAIN$. This quantity of fuel, $INJ\_MAIN$, is delivered to the combustion chambers of the engine at appropriate times to power the engine during the regeneration of the exhaust aftertreatment device 50.

Controlling the intake air compressing device 40 preferably comprises passing the torque error ($T_{O\_ERR}$) through a low-pass signal filter 83 to selectively remove high-frequency components of the torque error signal. The low-pass filter 'knee' comprises a calibration frequency that is preferably determined based upon air dynamics of the specific engine configuration.

The low frequency portion of the torque error signal is input to compressor control scheme, C(S)_VGT 84 for controlling operation of the intake air compressing device 40, which preferably comprises pre-calibrated proportional and integral elements. The output of the compressor control scheme, C(s)_VGT (84) comprises a correction factor, $VGT\_MAIN\_CORR$, which is added to an open-loop calibrated value for magnitude (in %) of opening of the VGT ($VGT\_INIT$) to determine a final magnitude (in %) of opening of the VGT 40 ($VGT\_FINAL$). The specifics of the compressor control scheme C(s)_VGT 84 are adapted according to specific operating characteristics of the intake air compressing device 40 used in the system.

As previously stated, an additional amount of post-injection can cause an increase in engine torque during regeneration of the exhaust aftertreatment system. In the embodiment described with reference to FIG. 5, any torque increase is compensated for by reducing the main injection command and decreasing magnitude of boost through the intake air compressing device 40 (i.e., reducing %-VGT opening), rather than compensating for the torque increase solely by reducing the main injection. Reducing boost acts further to increase exhaust gas temperature, thus reducing the quantity of fuel required to heat inlet to the exhaust aftertreatment device, leading to improved fuel economy. Since boost response time is relatively slow compared to fuel system response time, application of the low pass and high pass filters to the torque control errors permits compensating for low frequency torque error during regeneration by boost adjustment (% VGT) and compensating for high frequency torque error by adjusting the main injection fuel quantity, $I_{NJ\_MAIN}$. This permits improved driveability and fuel economy during regeneration due to the collaborative use of main injection, post-injection and boost.

It is understood that modifications in the hardware are allowable within the scope of the invention. The invention has been described with specific reference to the embodiments and modifications thereto. Further modifications and alterations may occur to others upon reading and understanding the specification. It is intended to include all such modifications and alterations insofar as they come within the scope of the invention.

Having thus described the invention, it is claimed:

1. Method for controlling operation of an internal combustion engine, comprising:
   monitoring in-cylinder pressure measurements;
   controlling a mass of post-injection fuel into a combustion chamber in response to an exhaust feedstream immediately upstream of an exhaust aftertreatment device to regenerate said exhaust aftertreatment device, wherein said controlling a mass of post-injection fuel raises exhaust feedstream temperature for said regeneration of said aftertreatment device;
   determining a torque error resulting from said controlling the mass of post-injection fuel into the combustion chamber based on the in-cylinder pressure measurements; and
   selectively controlling a mass of main fuel injection into each combustion chamber to maintain engine output torque in response to an operator torque request, said maintaining engine output torque comprising compensating for the torque error resulting from said controlling the mass of post-injection fuel into the combustion chamber.

2. The method of claim 1, wherein selectively controlling a mass of main fuel injection into each combustion chamber to maintain engine output torque further comprises:
   determining an initial fueling command based upon said operator torque request;
   determining a fueling correction based upon engine output torque and the operator torque request; and,
   adjusting the initial fueling command based upon the fueling correction.

3. The method of claim 2, wherein determining the fueling correction based upon engine output torque and the operator torque request comprises:
   determining the torque error further based upon the engine output torque and the operator torque request; and,
   executing a feedback control scheme based thereon.

4. The method of claim 1, further comprising: selectively controlling an intake air compressing device based upon the engine output torque.

5. The method of claim 4, wherein selectively controlling the intake air compressing device comprises varying position of the turbine vanes for the intake air compressing device.

6. The method of claim 4, wherein selectively controlling a mass of main fuel injection into each combustion chamber and selectively controlling the intake air compressing device based upon engine output torque further comprises:
   determining an initial fueling command and an initial command for the intake air compressing device based upon said operator torque request;
   determining a fueling correction and a correction for the intake air compressing device based upon engine-output torque and the operator torque request; and,
   adjusting the initial fueling command and the initial command for the intake air compressing device based thereon.

7. The method of claim 6, wherein determining the fueling correction further comprises:
   determining the torque error further based upon the engine-output torque and the operator torque request;
   high-pass filtering the torque error; and,
   executing a feedback control scheme based thereon.

8. The method of claim 6, wherein determining the correction for the intake air compressing device further comprises:
   determining the torque error further based upon the engine-output torque and the operator torque request;
   low-pass filtering the torque error; and,
   executing a feedback control scheme based thereon.

9. The method of claim 1, wherein controlling the mass of post-injection fuel into a combustion chamber to regenerate an exhaust aftertreatment device comprises selectively controlling an air/fuel ratio of the exhaust gas feedstream when the exhaust aftertreatment device being regenerated comprises a lean $NO_x$ trap device.

10. The method of claim 1, wherein controlling the mass of post-injection fuel into a combustion chamber to regenerate an exhaust aftertreatment device comprises selectively controlling temperature of the exhaust gas feedstream when the exhaust aftertreatment device being regenerated comprises a diesel particulate filter device.

11. Article of manufacture, comprising a storage medium having a computer program encoded therein for effecting a method to control operation of an internal combustion engine, the program comprising:
   code to monitor in-cylinder pressure measurements;
   code to control a mass of post-injection fuel into a combustion chamber in response to an exhaust feedstream immediately upstream of an exhaust aftertreatment device to regenerate said exhaust aftertreatment device, wherein said controlling the mass of post-injection fuel raises exhaust feedstream temperature for said regeneration of said aftertreatment device;
   code to determine a torque error resulting from said controlling the mass of post-injection fuel into the combustion chamber based on the in-cylinder pressure measurements; and
   code to selectively control a mass of main fuel injection into each combustion chamber based upon engine output torque to maintain the engine output torque in response to an operator torque request, said maintaining engine output torque comprising compensating for the torque error resulting from said controlling the mass of post-injection fuel into the combustion chamber.

12. Internal combustion engine, comprising:

a direct-injection internal combustion engine selectively operative at a lean air/fuel ratio;

an exhaust aftertreatment device; and, a control module:
   adapted to monitor a plurality of sensing devices and control a plurality of actuators; and,
   adapted to execute a plurality of algorithms contained therein to effect the following steps, the algorithms comprising:
      code to monitor signal inputs from the sensing devices including monitoring in-cylinder pressure measurements;
      code to selectively control a mass of post-injection fuel into each combustion chamber in response to an exhaust feedstream immediately upstream of the exhaust aftertreatment device to regenerate the exhaust aftertreatment device, wherein said controlling the mass of post-injection fuel raises exhaust feedstream temperature for said regeneration of said aftertreatment device;
      code to determine engine output torque based on the in-cylinder pressure measurements;
      code to determine a torque error resulting from said controlling the mass of post-injection fuel into the combustion chamber based on the in-cylinder pressure measurements; and
      code to selectively control a mass of main fuel injection into the combustion chamber to maintain the engine output torque in response to an output torque request, said maintaining engine output torque comprising compensating for the torque error resulting from said controlling the mass of post-injection fuel into the combustion chamber.

13. The internal combustion engine of claim 12, further comprising a variable geometry intake air compressing device.

14. The internal combustion engine of claim 12, wherein the code to selectively control the intake air compressing device based upon engine output torque further comprises:
   code to determine an initial fueling command and an initial command for the intake air compressing device based upon said operator torque request;
   code to determine a fueling correction and a correction for the intake air compressing device based upon engine-output torque and the operator torque request; and,
   code to adjust the initial fueling command and the initial command for the intake air compressing device based thereon.

* * * * *